Patented Jan. 7, 1936

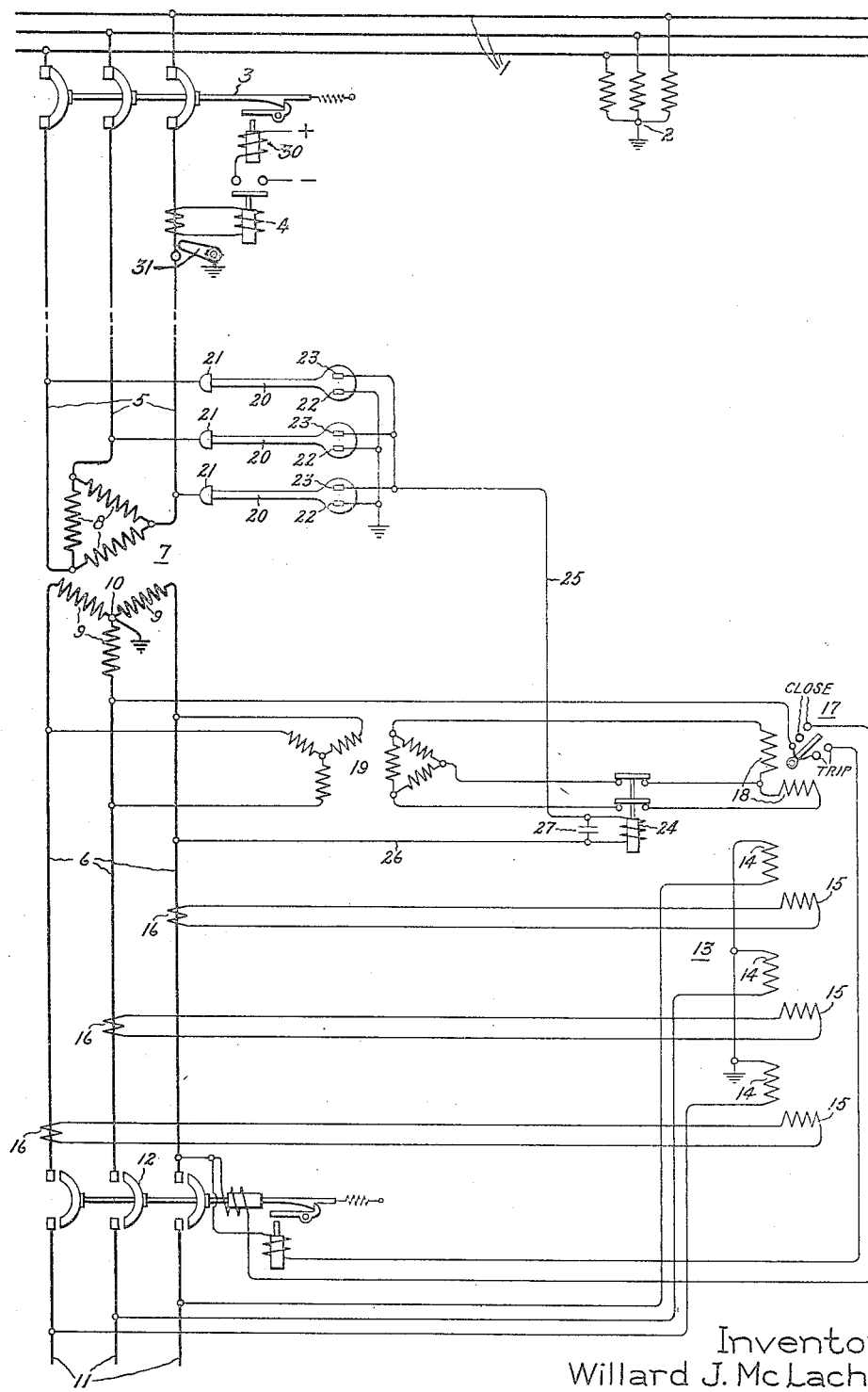

2,027,189

UNITED STATES PATENT OFFICE 2,027,189

CONTROL AND PROTECTION OF ELECTRIC CIRCUITS

Willard J. McLachlan, Scotia, N. Y., assignor to General Electric Corporation, a corporation of New York Application March 24, 1934, Serial No. 717,218

7 Claims. (Cl. 175—294)

My invention relates to improvements in the control and protection of electric circuits and more particularly to improvements in the control and protection of alternating current network distribution systems and an object of my invention is to provide a control and protective arrangement which is in general an improvement on arrangements heretofore known to the art.

In network distribution systems, one or more feeders are connected to the network through step-down transformers and network protectors. Energy directional responsive devices are usually associated with the protectors so as to disconnect the network from the feeder when for any reason, such as a fault on the feeder, power flow is from the network to the feeder. In order to isolate feeders for inspection and maintenance and incidentally to save losses, these energy directional responsive devices have been given a sensitivity of response such as to disconnect the network from the feeder merely on the reverse flow of power due to the magnetizing current of the transformer in a feeder out of service, that is, disconnected at the power station. This degree of sensitivity frequently results in unnecessary interruptions due to feed back from regenerating elevator motors or to circulating currents arising from slight differences in feeder voltages.

In order to avoid such undesired operations, the energy directional means was desensitized or restrained in some manner usually in dependence on the network voltage. But this sacrificed the desired feeder isolation control and also the tripping on reverse magnetizing current.

While these features are desirable, expensive potential devices for obtaining them must not increase the hazard of the system or reduce its economies of operation. Also, it is customary to apply a high voltage D. C. test to the feeders and connected equipment. Accordingly, any means provided to give the desired control and sensitivity should be able to withstand such high voltage tests without damage or change in characteristic and also in the event of systems with a large number of feeders not overload the testing means employed. Further, it is desirable to be able automatically to disconnect the network from the feeder by a simple operation performed at the station.

An object of my invention is to provide an improved control and protective arrangement for providing non-sensitive protection under normal operating conditions and yet obtaining a more sensitive operation whenever a ground occurs on the feeder whether the ground is accidental as a fault or purposely applied in order to disconnect the feeder from the network.

Another object of my invention is to provide such an improved arrangement as will not be affected by and will not interfere with the high voltage direct current tests which are applied to network systems of the type in question. These and other objects of my invention will appear in more detail hereinafter.

My invention is an improvement upon the control and protective arrangements disclosed in the co-pending application of Hudson R. Searing, Serial No. 732,049, filed June 23, 1934, for Control and protection of electric circuits, and assigned to the same assignee as this invention. The aforesaid Searing application contains claims dominating my subsequently made invention.

My invention will be better understood from the following description when considered in connection with the accompanying drawing and its scope will be pointed out in the appended claims.

In the single figure of the accompanying drawing, I have shown for the purpose of illustrating my invention an embodiment thereof as applied to the control and protection of an electric system comprising two electric circuits 5 and 6. As illustrated, these are three-phase circuits which are inductively coupled by a transformer 7 having windings 8 delta-connected to the circuit 5 and windings 9 Y-connected to the circuit 6 with the neutral point 10 grounded. The circuit 5 may represent one of a plurality of feeder circuits which are arranged to supply the network indicated schematically by the conductors 11. The network is connected to the respective feeders through suitable circuit interrupting means such as a latched closed circuit breaker 12. The feeders 5 extend from one or more power stations, one of which is indicated by a bus 1, which are usually provided with a suitably grounded neutral 2. Each feeder is provided with fault responsive protective means, illustrated simply as a latch closed circuit breaker 3 whose trip coil 30 is under the control of overcurrent relays 4, only one of which is shown, for opening the feeder at the power station on the occurrence of abnormal conditions on the feeder. At the power station the feeder may be provided with means such as a suitable switch 31 for grounding one or more of the feeder conductors after the station feeder circuit breaker has opened, as disclosed for example in British Patent 396,853. Likewise as disclosed in United States Letters Patent 1,883,839, issued October 18, 1932, there may be provided energy directional responsive means such as a polyphase power directional relay 13 which is responsive to the exchange of energy between the network and the feeder to effect the opening of the circuit breaker 12 when energy flow is from the network to the feeder. This relay comprises voltage windings 14 which are connected to be energized from the network side of the circuit breaker 12 and cooperating current windings 15 which are connected to be energized from current transformers 16 on the feeder side of the circuit breaker 12. Also, as disclosed in the said United States Letters Patent, the relay 13 may be provided with a restraining or desensitizing means 17 which is simply illustrated as two voltage windings 18. These are connected to be energized by the potential transformer 19 and to exert a restraining torque tending to prevent movement of the relay to the tripping position.

In accordance with my invention, I provide means responsive to a ground on the circuit 5, whether the ground is accidental, as a ground fault, or is purposely applied at the power station by moving the switch 31 to the grounding position after disconnection of the circuit from the bus 1, for increasing the sensitivity of response of the relay 13 whereby to insure the disconnection of the network 11 from the feeder 5 by the opening of the circuit breaker 12. As shown, this means comprises one or more electric discharge valves 20 which are normally non-conductive but which are so connected as to become conductive when the voltage to ground of a phase conductor of the circuit 5 exceeds a predetermined value. For this purpose the discharge valves 20 may be connected between the phase conductors of the circuit 5 and ground, as shown. For cost, simplicity and convenience in operation, the valves 20 may be of the cold cathode glow discharge type having a control electrode 21 which is connected to the phase conductor and two discharge electrodes 22, 23, one of which is grounded. The discharge electrodes of each valve are connected in a circuit which includes means such as an auxiliary relay 24 for controlling the sensitivity of the restraining means 17 when the valve becomes conductive whereby to sensitize the directional responsive relay 13. The operating circuit for the auxiliary relay 24 may be energized from any suitable source whose voltage is insufficient to render the valve conductive under normal conditions. Thus, for example, the circuit of this relay may include the grounded electrode 22, the associated discharge electrode 23, the conductor 25, the winding of the auxiliary relay 24, the conductor 26, the right-hand phase conductor of the circuit 6, the transformer winding 9 associated with this conductor and the neutral 10 to ground. A D. C. source could be used, if desired.

Whenever the voltage to ground of a phase conductor of the circuit 5 exceeds a predetermined value, the voltage across the control electrode 21 and the grounded discharge electrode 22 of the valve associated with this conductor is such as to render the valve conductive. Current is thereby enabled to flow in the circuit of the auxiliary relay 24 which, when energized, opens its contacts in the circuits of the voltage windings 18 of the restraining means 17, whereby to remove the restraint. Inasmuch as the characteristic of a cold cathode glow discharge valve is such that the current flow between the discharge electrodes is of an intermittent oscillatory type when an alternating voltage is applied to the control electrode, a smoothing condenser 27 is preferably connected across the winding of the auxiliary relay 24.

Assuming, for example, a ground fault on the circuit 5, the protective means at the power station operates to disconnect the feeder at the station. The voltage to ground on the ungrounded conductors of the feeder 5 rises from Y voltage to delta voltage because the feeder is still energized from the network. The valves 20 associated with the ungrounded conductors become conductive. The circuit of the auxiliary relay is energized as previously pointed out and this relay operates to remove the restraint from the relay 13. By reason of the increased sensitivity the directional relay 13 operates to effect the tripping of the circuit breaker 12, in response to the flow of transformer magnetizing current from the network to the feeder.

If it is desired to isolate a feeder from the network at any time, the circuit of the feeder may be opened at the power station by opening the circuit breaker 3 and then one of the feeder conductors grounded by moving the switch 31 to the grounding position. As soon as this is done, the voltage to ground of the ungrounded conductors rises from Y voltage to delta voltage. Consequently, the valves 20 associated with the ungrounded conductors of the feeder become conductive. The auxiliary relay 24 is accordingly energized and operates to so sensitize the directional relay 13 as to insure the tripping of the circuit breaker 12 on the flow of transformer magnetizing current from the network to the feeder.

It will be observed that with control and protective arrangements embodying my invention the use of costly potential devices, such as potential transformers, and the consequent hazards which they introduce by reason of the voltages involved are eliminated. Such devices would be particularly more hazardous because of the frequent applications of the high voltage D. C. tests applied to the feeder circuits and connected apparatus.

While I have shown and described my invention in considerable detail, I do not desire to be limited to the exact arrangements shown but seek to cover by the appended claims all those modifications which fall within the true spirit and scope of my invention.

What I claim as new and desire to secure by Letters Patent of the United States, is:—

1. In combination, two electric circuits arranged for exchange of energy, means responsive to the direction of energy exchange for interrupting one of said circuits, electric discharge valve means connected to be energized in accordance with the voltage to ground of one of the conductors of one of said circuits to become conductive on the occurrence of a ground on another of said conductors, and means for varying the sensitivity of said directional responsive means when said valve means becomes conductive.

2. In combination, a three-phase feeder circuit, a three-phase network circuit, a transformer having windings delta-connected to the feeder circuit and windings Y-connected to the network circuit, means responsive to the direction of energy exchange between said circuits for interrupting the network circuit, a normally non-conductive electric discharge valve having a control electrode connected to be energized in accordance with a voltage to ground of the feeder circuit and discharge electrodes having impressed across them a voltage derived from the network circuit and insufficient to render the valve conductive, and means for increasing the sensitivity of said directional responsive means operative when the magnitude of the voltage on said control electrode renders the valve conductive.

3. In combination, a feeder circuit of the type wherein a ground on one conductor results in an increase in voltage between another conductor and ground, a network circuit inductively coupled thereto, means responsive to the direction of energy exchange between said circuits for interrupting one of the circuits, electric discharge valve means connected to be energized in accordance with the voltage to ground of one of the conductors of said feeder to become conductive on the occurrence of a ground on another conductor of the feeder, and means for increasing the sensitivity of said directional responsive means operative when said valve becomes conductive.

4. In combination, two electric circuits arranged for exchange of energy, means responsive to the direction of energy exchange for interrupting one of said circuits, an electric discharge valve having two discharge electrodes and a control electrode, means for impressing a voltage across said discharge electrodes normally insufficient to render said valve conductive, electroresponsive means for controlling the sensitivity of said directional responsive means connected in circuit with said discharge electrodes, and means for impressing across said control electrode and one of said discharge electrodes a voltage derived from the other of said circuits for rendering said valve conductive when said derived voltage exceeds a predetermined value whereby to effect the operation of said electroresponsive means.

5. In combination, two three-phase circuits, a transformer having windings delta-connected to one of said circuits and windings Y-connected to the other of said circuits, means responsive to the direction of energy exchange between said circuits for disconnecting said other circuit from its Y-connected windings, a normally non-conductive electric discharge valve having a control electrode connected to be energized in accordance with a voltage dependent on the voltage to ground of a conductor of said one circuit and discharge electrodes having impressed across them a voltage dependent on the voltage between two phase conductors of said other circuit and insufficient to render the valve conductive, and means for increasing the sensitivity of said directional responsive means operative when said voltage to ground exceeds a predetermined value sufficient to render said valve conductive.

6. In combination, a feeder circuit, a network circuit inductively coupled thereto, a circuit breaker in said network circuit, means responsive to the direction of energy exchange between said circuits for controlling said circuit breaker, means connected to be energized from the network circuit for restraining the operation of said energy directional means, a normally non-conductive electric discharge valve having a control electrode connected to be energized in accordance with a voltage to ground of a conductor of the feeder circuit and discharge electrodes having impressed across them a voltage derived from the network circuit and insufficient to render the valve conductive, and means for effecting the deenergization of said restraining means operative when the magnitude of the voltage on said control electrode renders the valve conductive.

7. In combination, two three-phase circuits, a transformer having windings delta-connected to one of said circuits and windings Y-connected to the other of said circuits, means responsive to the direction of energy exchange between said circuits for interrupting one of said circuits, two normally non-conductive electric discharge valves each having two discharge electrodes and a control electrode, the control electrodes of said valves being connected to be energized respectively in accordance with the voltages to ground of two phase conductors of the circuit having the delta-connected windings, a source of electromotive force, a circuit including said source and the discharge electrodes of said valves, and means connected to be energized from said circuit for effecting a change in the sensitivity of said directional responsive means.

WILLARD J. McLACHLAN.